(12) United States Patent
Peters

(10) Patent No.: US 7,043,378 B2
(45) Date of Patent: May 9, 2006

(54) MEASUREMENT UNIT

(75) Inventor: Michael Peters, Kuessaberg (DE)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/780,619

(22) Filed: Feb. 19, 2004

(65) Prior Publication Data

US 2004/0230386 A1 Nov. 18, 2004

(30) Foreign Application Priority Data

Feb. 19, 2003 (DE) ................. 103 07 118
Mar. 12, 2003 (CH) .............. 2003 0386/03

(51) Int. Cl.
*G01R 15/00* (2006.01)
(52) U.S. Cl. ....................................... 702/57
(58) Field of Classification Search ............. 324/76.19, 324/536; 600/300; 364/138, 563; 702/57, 702/64–65, 188–189
See application file for complete search history.

(56) References Cited

U.S. PATENT DOCUMENTS

| | | | | |
|---|---|---|---|---|
| 5,638,299 A | | 6/1997 | Miller | 364/550 |
| 5,642,038 A | * | 6/1997 | Kim et al. | 324/76.19 |
| 5,839,094 A | | 11/1998 | French | 702/91 |
| 6,515,594 B1 | | 2/2003 | Rettig | 340/870.27 |
| 6,712,762 B1 | * | 3/2004 | Lichter et al. | 600/300 |
| 2002/0029151 A1 | | 3/2002 | Shofner et al. | 705/1 |
| 2004/0196840 A1 | * | 10/2004 | Amrutur et al. | 370/389 |

FOREIGN PATENT DOCUMENTS

| | | |
|---|---|---|
| EP | 0 482 229 | 4/1992 |
| WO | WO97/20447 | 6/1997 |
| WO | WO03/017832 | 3/2002 |

OTHER PUBLICATIONS

Search Report from EPO, Jun. 1, 2004.
Search Report from CH 2003 0386/03 (Mar. 12, 2003).

* cited by examiner

*Primary Examiner*—John Barlow
*Assistant Examiner*—Cindy D. Khuu
(74) *Attorney, Agent, or Firm*—Cermak & Kenealy, LLP; Adam J. Cermak

(57) ABSTRACT

A measurement unit (1) for collecting and forwarding measured data, includes at least one measuring point for determining the measured data, and at least one interface for at least indirectly transferring the measured data to a control center (2). A particularly efficient and secure mode of operation that ensures a low network load with reference to networks used for data transmission is rendered possible in the case of such a measurement unit by virtue of the fact that the measurement unit (1) also has a process unit and means (RAM, hard disk) for local storage of measured data in the measurement unit (1), that the measured data are firstly transferred from the measuring point to the process unit, these measured data firstly being transformed into digital signals via an analog-to-digital converter (ADC) if they are made available by the measuring point in analog form, and that the measured data are subsequently written actively by this process unit into a database (6) of the control center (2).

13 Claims, 4 Drawing Sheets

MEASUREMENT UNIT

TECHNICAL FIELD

The present invention relates to a measurement unit for collecting and forwarding measured data. It also relates to a method for collecting and forwarding measured data.

PRIOR ART

Modern measurement units frequently offer an interface (for example RS232, RS485, Ethernet, field bus etc.) for interrogating the measured values in digital form (for example on a PC). In general, being able to store data requires additional software (on a control system or computer) that can be used to retrieve data from the measurement unit and can be written to a target for storing the data.

Typical measurement units according to the prior art are illustrated in FIG. 1. As illustrated in FIG. 1a), the above-named software can, on the one hand, be executed directly on the target system for storing the data ("data server"). Consequently, the data are typically selected continuously by the measurement unit and retrieved via a data line by the data server directly after the measurement or synchronously with the measurement.

Alternatively, it is known to provide so-called transfer systems between the measurement unit and the data server. This situation is illustrated in FIG. 1b). The transfer system serves the purpose of retaining the measured data, collected in the measurement unit and transferred to the transfer system via an interface, in a data store on the data server. It is necessary in this context to refer to the possibilities of using a so-called CAN (Controller Area Network) bus, which must likewise be accounted as prior art.

In both instances, the software toward the measurement unit side makes use of the manufacturer-specific protocol to communicate therewith (in accordance with the interface thereof). In the data storage direction, this is a connection to a storage medium (as a rule, writing to a file that includes the measured data), or else a database connection.

SUMMARY OF THE INVENTION

The invention is therefore based on the task of providing an advantageous measurement unit that is reliable, particularly with reference to the use of several independent measurement units with a single control center, and that serves to collect and forward measured data. In particular, this is a measurement unit comprising at least one measuring point, for example in the form of a probe, for collecting the measured data, and at least one interface for transferring the measured data, at least indirectly, to a control center.

The object is achieved according to the invention by virtue of the fact that the measurement unit also has a process unit (processor, CPU) and means for local storage and/or processing of measured data in the measurement unit. The means for local storage of the measured data can be any desired writable media, for example random access memory (RAM), hard-disk storage such as also SanDisk etc. inter alia. However, the measured data need not necessarily be buffered on the measurement unit. It is also possible to undertake direct preprocessing of the measured data on the flight, as it were, and this can consist, for example, in reducing the data before transmission. In such a unit, the measured data are firstly transferred from the measuring point to the process unit, these measured data firstly being converted into digital signals via an analog-to-digital converter if they are made available by the measuring point in analog form. Of course, it is also possible for the measuring point to collect the measured data directly in digital form. For example, a light sensor can provide a signal which is such that only a statement of light on or light off is output. Such collect systems are mostly equipped with several parallel channels. Subsequently, the measured data are written actively by this process unit into a database or a file of the control center. A database or a file is to be understood here quite generally as one (or else several) data stores on a storage medium, and this can therefore be a database in the narrower sense, a table inside a database, for example, a file in a quite general sense, or the like.

The core of the invention therefore consists in providing local intelligence in the measurement unit, as it were. The measured data are correspondingly not simply transferred from the measurement unit to the control center by having the control center retrieve the data at the measurement unit, or by having the measurement unit send the data to a network, but rather the procedure is to provide means that permit the measurement unit to transfer the measured data to the control center independently and actively, and to enter them in the control center in a file or in a database or a table in the database. In other words, the measurement unit is not simply a unit which is incorporated in a network and from which data are retrieved or which sends the data to the network, but the measurement unit is effectively a client of a data server, here the control center. This results in a substantially higher degree of independence and freedom from error during operation of such measurement units.

Moreover, it is thereby possible to optimize the load on a network that is used to transmit data from the measurement unit to the control center. Further advantages of this design will be seen further below.

Fundamentally, the measurement unit can enter the data in the database or file(s) in the control center in a raw fashion, that is to say without any (pre-) processing on the part of the measurement unit and as measured. In accordance with a first preferred embodiment of the present invention, the design particularly permits the measured data to be processed at least partially in the process unit before they are transferred to the control center. It is therefore possible for example, to prevent raw data, which usually demand substantially more storage space, from being sent over the network in a first step and subsequently only then being processed in the server and filed. This processing in the measurement unit can correspondingly involve different methods that run in the process unit after the reception of the data from the measuring point and before the data are transferred into the file or into the database in the control center, and thus, for example, involve compression, filtering, assignment, a mathematical transformation, the formation of a (for example sliding) mean etc., or a combination of these types of processing.

It is possible, for example, to use a processor as process unit, while it is also possible to conceive a freely programmable logic unit that is optimized for this task (for example an Altera module [FPGA]).

It is possible to achieve a further optimization of the data processing by virtue of the fact that measured data measured in an essentially continuous or clocked fashion are transferred from the process unit to the control center in periodic packets, this transfer taking place, in particular, preferably at least 1 to 20 times per minute. Of course, in this case the clock frequency is a function of the type of measurement and, depending on requirements and conditions, can also be 1 000 000 per second or only once per day as regards measured variable or the monitoring thereof, respectively. The transfers can also be performed at high frequency when a rapid reaction to measured values is required, for example, for control purposes. However, if typical monitoring is involved, in particular with reference to long term behavior, it is frequently sufficient to enter data in the database only in a one minute cycle or even in the range of a few times per hour. These data can either be data that are a function of time and are simply transferred in sections, but in the case of which there is subsequently an entire time dependence available on the server, or they can also be mean values that are formed over these time periods or over shorter time periods.

In accordance with a further preferred embodiment of the measurement unit according to the invention, the control can also be substantially simplified by the control center filing the control commands in a database or a file, that is to say by filing the control commands in at least one database or one file, and by the process unit independently reading out these control commands periodically from the control center or the database or file present thereon, and controlling the measurement unit in accordance with these control commands. In other words, it is not the case that, as is customary in the prior art, a corresponding instruction is respectively transferred actively from the control center to the measurement unit, but rather the procedure is that the control center enters appropriate instructions in a file (job queue) that is to say that these instructions are entered in a file in the control center and the measurement unit subsequently independently makes an active periodic search in this job queue and processes the associated jobs.

Since it is normally the case in regard to a measurement unit that not only need the measurement unit simply be switched on or off, but rather that a certain number of measurement parameters have to be transferred, it is necessary for said parameters to be retrieved together with the job. Alternatively, it is correspondingly possible for these measurement parameters to be filed directly in the job queue, but this has the disadvantage that no history is available because processed jobs are usually deleted in such a job queue. Correspondingly, it is possible to proceed alternatively such that the control center also files parameters assigned to the control commands in a further database or a file/table with the parameters, that is to say these control commands and assigned parameters have been or are filed in a further database in the control center, and that the process unit periodically reads out these parameters together with the control commands and controls the measurement unit in accordance with these control commands and the associated parameters.

In accordance with a further preferred embodiment of the invention, a file or, in the case of a database, a table with the status information is also made available on the data server. After readout of control commands and/or parameters from the databases, the process unit correspondingly protocols the appropriate action in a database (so-called "handshaking method"). It is possible in this case either simply to keep to the execution per se or to write into the file, or else simultaneously also certain parameters such as, for example, time, measurement parameters etc.

It may be noted in general as regards the terminology that a server can accommodate one or more databases. A database can accommodate an arbitrary number of tables. Data are filed in tables.

The process unit typically reads out control commands or parameters at between 1 to 20 times per minute, at least.

In accordance with a further preferred embodiment of the invention, the control center is a data server (for example also a database), and the measurement unit has a network interface, that is to say a communication interface, this preferably being here, that is to say in the case of the network, in particular a local network (LAN) that can be wired (for example twisted pair, etc.) or wireless.

A measurement unit of the above type can, inter alia, advantageously be used in conjunction with the measurement and collection of partial discharge data at a generator system, in particular for measuring and collecting partial discharges detected at high-voltage terminals.

The present invention also relates to a method for collecting and forwarding measured data by using a measurement unit as has been described above. Such a measurement unit is preferably characterized in that it independently periodically files the measured data in the control center, that is to say in a database in the control center, for example, and that the measurement unit periodically and independently retrieves control commands and, if appropriate, associated parameters from databases likewise present in the control center, that is to say from the control center, and that preferably the status of the measurement unit is also periodically filed in the control center, that is to say in a further table in a database, for example.

Further preferred embodiments of the measurement unit according to the invention and of the method according to the invention are described in the dependent claims.

BRIEF DESCRIPTION OF THE FIGURES

The invention is to be explained in more detail below with the aid of exemplary embodiments in conjunction with the drawings, in which.

Figure 1:
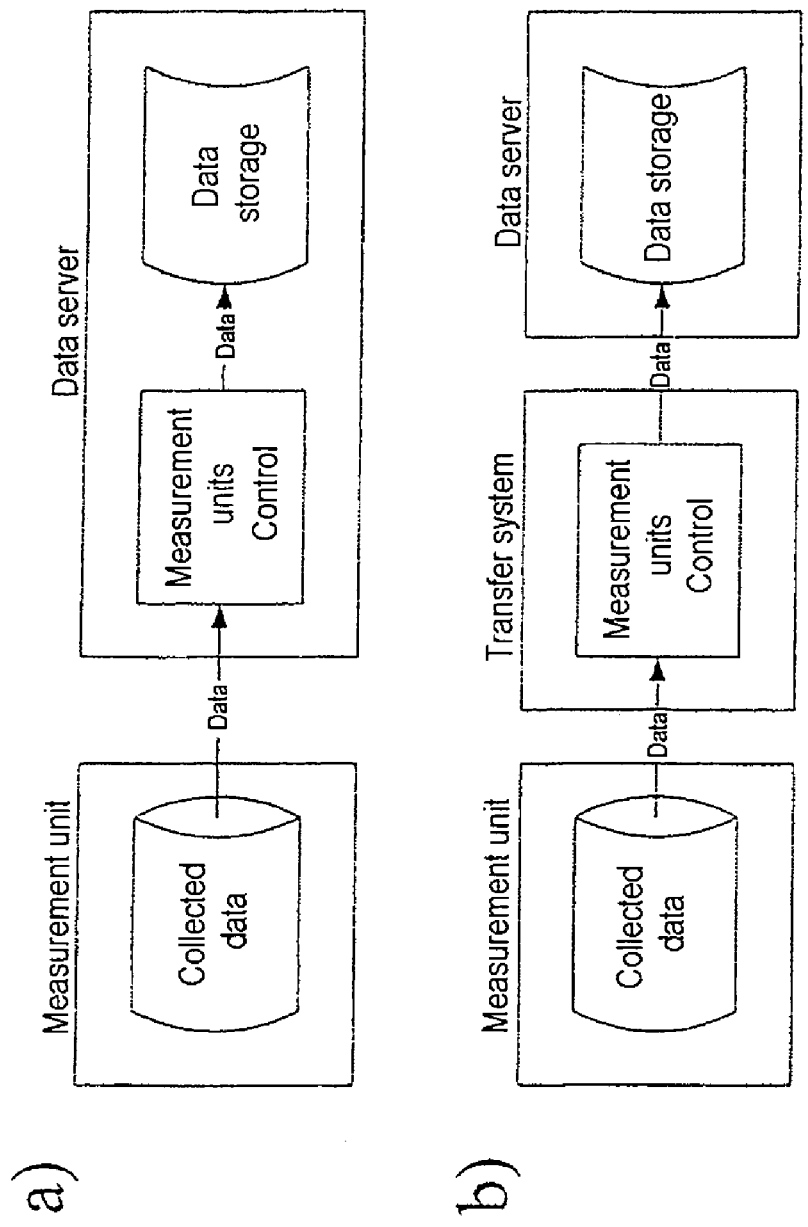
FIG. 1a) shows a schematic of the data collection of current measurement units.
Figure 2:
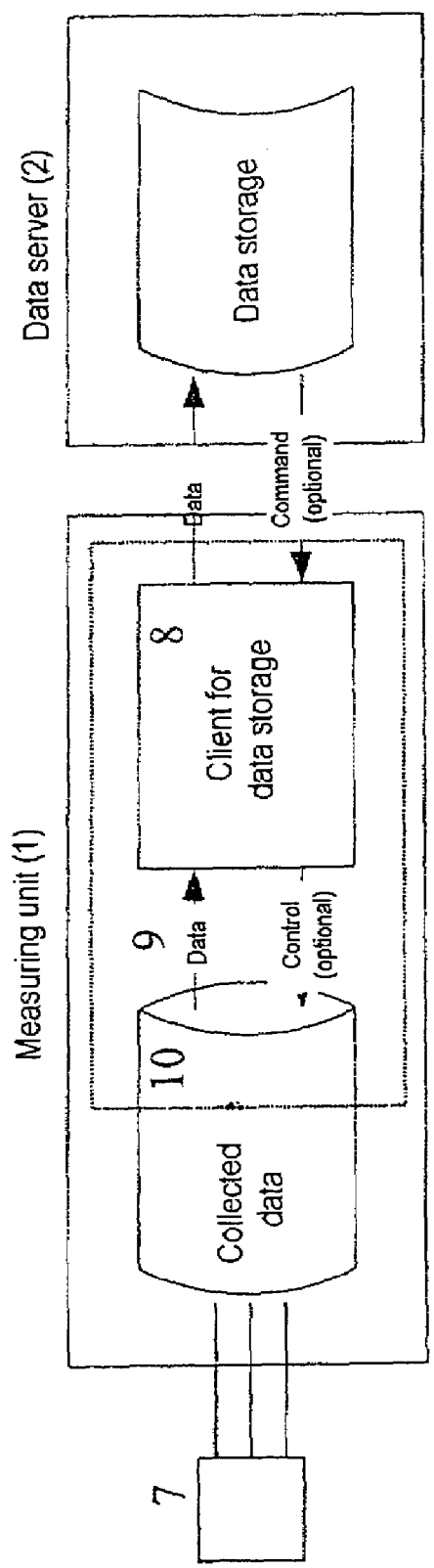
Figure 3:
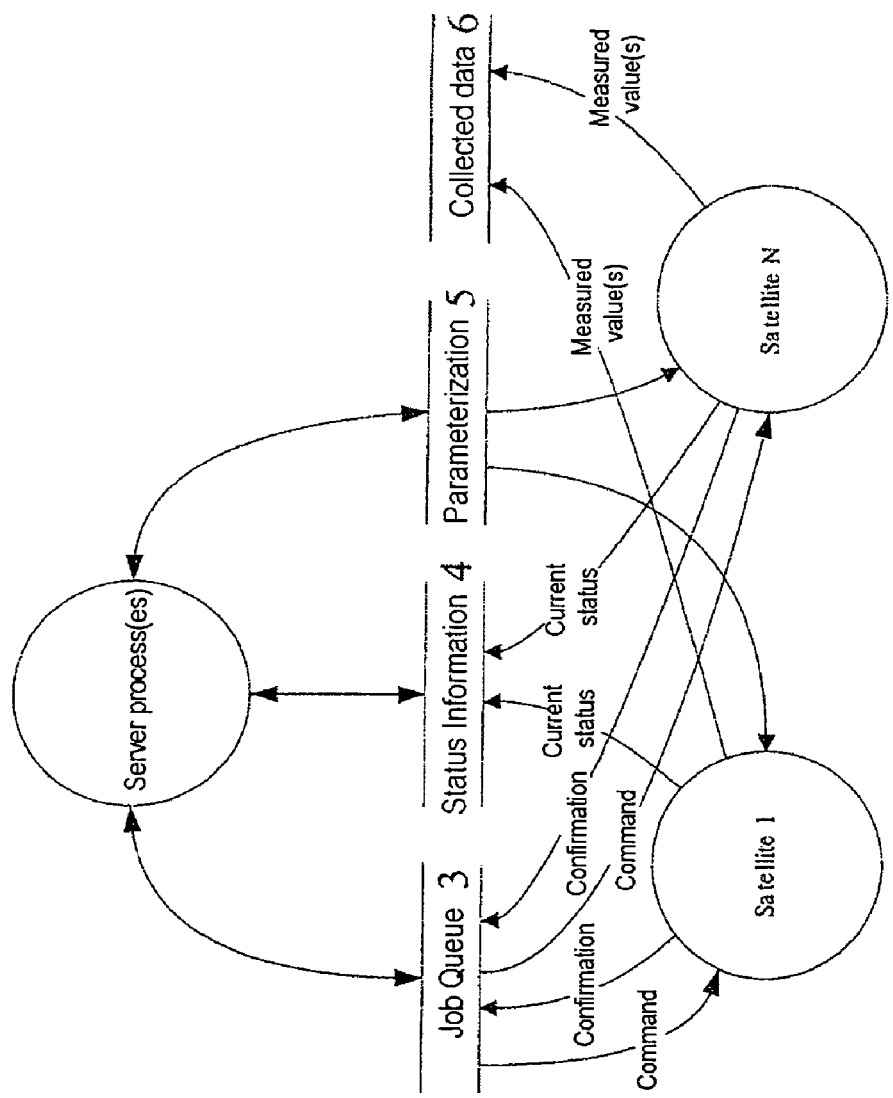
Figure 4:
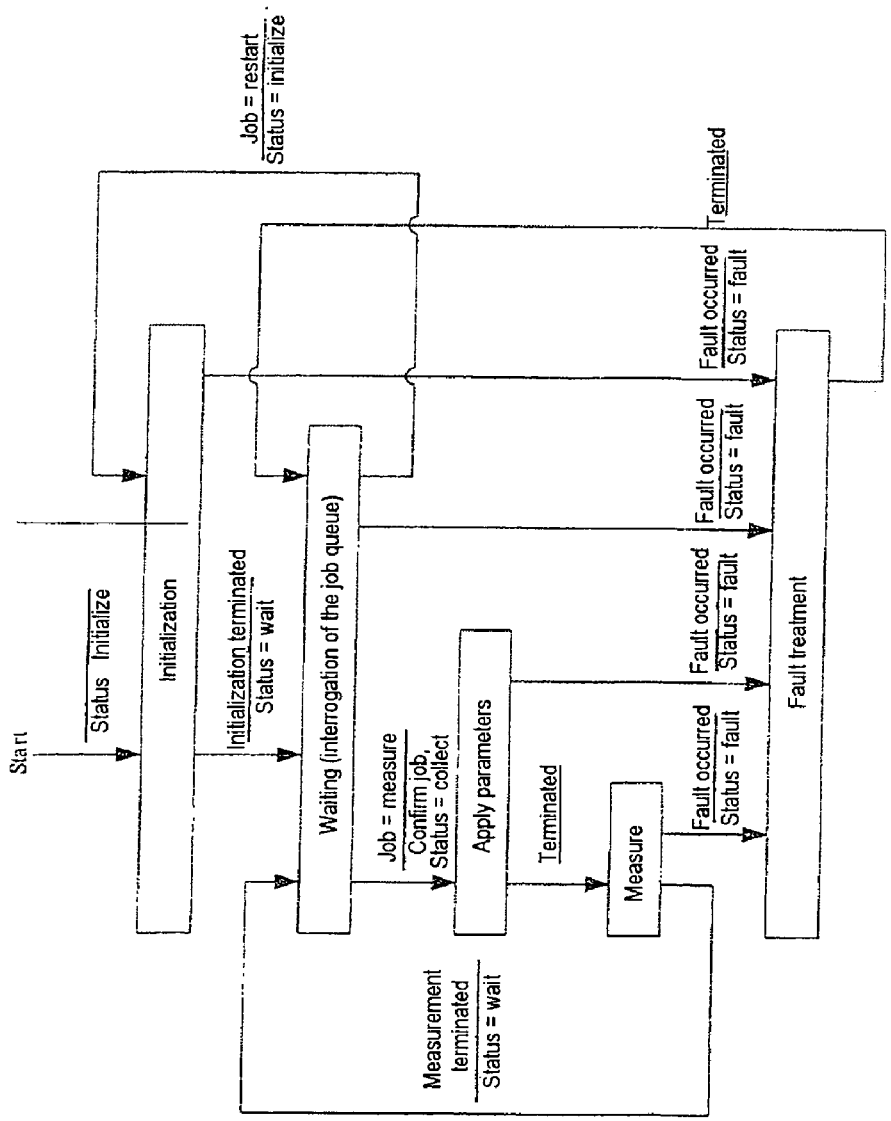

b) a further schematic of the data collection of current measurement units with a transfer system;

FIG. 2 shows a schematic of a measurement unit according to the invention together with the data server;

FIG. 3 shows an overview of the communication between measurement units and data server; and FIG. 4 shows a state diagram of a measurement unit.

WAYS OF IMPLEMENTING THE INVENTION

FIG. 2 shows a schematic of a measurement unit 1 that is intended as an exemplary embodiment here. The measurement unit has one or more measuring points 7, for example in the form of a probe that collects the actual physical data. When the data are available as digital data 9 after being collected, they can be transferred directly to a process unit 8 to be transferred to the data store. If the data from the measuring points 7 are present in analog form, they must firstly be digitized via an analog-to-digital converter (ADC) 10. The process unit 8 is likewise located in the measurement unit 1. The process unit 8 or the measurement unit 1 has means for storing the collected data temporarily or in a way lasting for a while. The process unit 8 can also be capable as an option of controlling the measuring points 7 and the process (for example the A/D conversion) via control data.

Use is made in the measurement unit of a process unit that forwards the collected data 9 to a remote system together with the program code (which can also be hardware such as a LON & CAN controller) for a data link 8. This remote system can likewise pass commands to the measurement unit. Control commands are not mandatory when the measurement unit 1 can execute measurements independently without control from outside. Control commands can be, for example, commands to start or stop a measurement, commands for selecting measuring points, gains for the A/D converters, etc. etc. The process unit 8, 10 typically has a memory (for example RAM or ROM) in which the corresponding operating software is available.

The control center 2, possibly a remote system and/or a data server, can be both a file system, database system or other storage medium for data storage. The transmission of the data is performed by the measurement unit, the client 8, with the aid of the requisite transmission protocol that the data server and/or the data store require.

When use is made of a database, the control commands can be read out directly from a table located in the database by the database client located in the measurement unit. In the case of FIG. 2, control commands are retrieved by the measurement unit, interpreted and used internally for controlling the measurement unit 1. The control commands are conducted on the data server in a table that is usually denoted as job queue 3.

The collected data are transferred by the measurement unit 1 from the collection of measured values to the database.

Such a mode of procedure results, inter alia, in the following advantages:

This method or this design permits several and also different measurement units 1 to operate independently of one another at the control center 2 (for example data server), it being possible to control all the measurement units 1 separately or jointly from this control center 2 (for example from a central location). This is sensible for tasks in monitoring, measurement, control and regulation, for example.

The measurement units 1 are relatively independent on the spot. On the one hand, they can collect data permanently and continuously, individually or in blocks, and write to a database independently or on command (usually in clock fashion, that is to say writing only in specific time intervals), collect autonomously and write to the database on command, or else file data in the database only on command. In other words, on the one hand the collection is performed independently or on command, in which case individual values or whole blocks or data are continuously collected. On the other hand, the data collection is performed independently or on command, in which case individual values or whole blocks or data are transmitted continuously (continuous data streams, usually denoted as streams).

It is also possible for the data quantity that arises depending on the measurement principle to be compressed or rationally reduced directly in the measurement unit 1 with the aid of appropriate algorithms, in order to minimize the data transfer volume on the transmission path, and this is performed in the element for data collection 10. This task can be performed directly in the measurement unit 1 by a CPU, or by a special logic unit optimized for this task. It is possible in principle for any rational preprocessing of the data such as, for example, mathematical transformations, compressions, formation of mean values, etc., to take place in the measurement unit 1.

A single measurement unit or a group of measurement units can simultaneously collect large data quantities without considering the data transmission to a central server. Whereas in accordance with the prior art the network load rapidly reaches the limits, typically when use is made of several measurement units, in the case of the measurement units 1 proposed, it is possible to use the bandwidth in the network substantially more efficiently by skillful organization of preprocessing of the data and pinpointed optimized transfer of the data into the database.

The use of a central location for the data store simplifies the handling and enhances the overview by reducing the susceptibility to error. Moreover, such a system can be implemented more easily and simply.

The communication between a measurement unit 1 and the control center (for example a data server 2) is accomplished at database level. Provided for this purpose in the database are tables for communication, for reporting the status of the measurement units, for parameterization and for holding the measured data.

Processes on the server side generate commands (jobs) for the individual measurement units 1, monitor their execution, generate tips, warnings and alarms etc. etc.

It must be noted in conjunction with the element for data collection 10 that the latter is, for example, an analog-to-digital converter or a digital collection followed by a provision of the data 9.

It may be pointed out in conjunction with the client for the data store 8 that this can be a program or hardware that transfers the data to the unit 2.

It is also shown by dashes in FIG. 2 that the process unit 8 can also incorporate the collection 10 and the client 8.

An overview of the processes under way is illustrated in FIG. 3, the illustrated satellites 1 to N corresponding to individual measurement units 1. Four tables, in particular, are present in accordance with FIG. 3, and these serve the purpose of reciprocal communication.

Firstly, this is a first table, the so-called job queue 3, in which the control commands are filed and which the individual measurement units 1 access. It is possible to provide a dedicated job queue 3 for each measurement unit 1, but a single job queue 3 is preferably set up and managed for all the measurement units 1.

A further table is also filed under the term of status information 4. The measurement units 1, or in some cases also the server process, file the instantaneous status in this table or file or database. In particular, this table contains acknowledgements/logs of measurement processes initiated, state messages, etc.

Reference may also be made to the parameterization 5 as a further table. This table retains measurement parameters relevant to the individual measurements or individual measurement units. The content of this table is typically fixed by the server process and only read out further subsequently by the measurement units. In the case of simpler controls where it is possible to dispense with a parameter history in the parameterization 5, the latter would also be possible directly via the job queue 3.

Finally, FIG. 3 further illustrates a table or file or database that accommodates the collected data 6. This table 6 is typically written to only by the measurement units. As already indicated with reference to table 3, tables 4, 5 and 6 can possibly be set up and managed for each measurement unit individually. However, all the measurement units present in the system will frequently make use of the same files or databases.

A measurement unit 1 itself operates as client for the database located in the data server 2. It monitors the job queue 3, receives or procures its parameterization data (if necessary) from the table of the parameterization 5 or via the job queue 3, signals its status information by writing this in the table of status information 4, and writes the collected data into the table, provided therefore, of collected data 6.

In order to be able to address several measurement units 1, the latter must have a unique identification mark, for example a serial number that is stored inside the measurement unit. This mark is registered in the database. A measurement unit 1 only executes a job when the latter is specifically addressed to this measurement unit, that is to say is filed in the job queue 3 under its serial number, for example.

FIG. 4 shows a typical state diagram of a measurement unit 1. Of course, variations are also conceivable, depending on the properties a measurement unit 1 has, on what is to be collected, on whether there is, for example, an input changeover switch that must be controlled, on whether there are programmable amplifiers or filters that must be set or calibrated, on whether there are measuring points that must be calibrated, etc. etc.

A job queue table 3 for FIG. 4 might look as follows, for example:

| Value | Note |
|---|---|
| Measurement | Command the measuring unit to carry out a measurement |
| Restart | Command the measuring unit to restart its system |

Once a job for a measurement unit 1 has been written into the associated table 3 by one of the server processes, the corresponding measurement unit 1 must confirm this job before it is executed via the unit (handshaking method).

A monitoring process can derive a malfunction of a measurement unit 1 therefrom if it has not been possible to confirm a job within a prescribed time.

In the case of most state transgressions, the measurement unit 1 reports its new state in the status table 4 (denoted by "status=xxx" in FIG. 4).

A status information table 4 for FIG. 4 might look as follows, for example:

| Value | Note |
|---|---|
| Wait | A measurement unit is waiting for a new job |
| Collect | A measurement unit reports that it is currently collecting data |
| Initialize | A measurement unit reports that it is currently starting |
| Fault | A measurement unit reports an internal fault<br>In this case, the measurement unit writes the fault source/message to the message field of the status information table. |

Here, as well, it is possible to derive malfunctions of a measurement unit 1 from a monitoring process via the status information table 4.

Further examples are to be given in order to explain the individual tables 3 to 6 yet more clearly:

Job Queue Table 3

Is used for conveying commands to the measurement units 1, and for handshaking in order to monitor execution by the various measurements units.

| Field | Note |
|---|---|
| Measurement unit ID | Identification for which of the measurement units a job is valid |
| Job | Identifier for the next activity to be executed by the measurement unit |
| Job time | Date and time of day of setting up a job |
| Job confirmed | Identification as to whether a measurement unit has accepted a job and is therefore executing it |
| Parameter | Possible field for transferring parameters; for systems that require no history of the parameters. |

It is possible in addition as an option also to file parameters directly in this table. If this is done, the measurement unit need only monitor one table and not two tables as in the case of a parameter table.

Particularly in conjunction with the measurement of partial discharges on turbine systems it has proved in this case to be sufficient for the measurement unit 1 to make a search approximately every 60 seconds in the job queue 3 as to whether new activities are present or whether current activities must be terminated.

Status Information Table 4

Each measurement unit 1 shows its current state or an activity currently being executed in this table. Should a fault have ocurred on the measurement unit 1, the latter can communicate details on this via the message field.

| Field | Note |
|---|---|
| Measurement unit ID | Identification of the measurement unit |
| Status time | Date and time of day of the status entry |
| Current status | Identification of the current status of the measurement unit |
| Message | Optional message from the measurement unit |

Parameter table 5, for history, otherwise it is also possible to transfer parameters into the job queue 3.

This table relates to the measurement unit's various settings for the job to be executed next.

| Field | Note |
|---|---|
| Measurement unit ID | Identification of the measurement unit |
| Parameter | Setting values for the measurement unit for the next measurement |

Data Table 6

A measurement unit 1 writes its data to this table.

| Measurement unit ID | Identification of the measurement unit |
|---|---|
| Data | Data sent by the measurement unit |

LIST OF REFERENCE NUMERALS

1 Measurement unit
2 Control center, data server
3 Job queue (file)
4 Status information (file)
5 Parameterization (file)
6 Measured data collected (file)
7 Measuring point, probe
8 Program or hardware for data transfer (for database=client), process unit
9 Data that are transferred from data collection to data storage via the client.
10 Data collection (hardware and software)

The invention claimed is:

1. A measurement unit for collecting and forwarding measured data, the unit comprising:
   at least one measuring point for determining the measured data;
   at least one interface for at least indirectly transferring the measured data to a control center;
   a process unit and means for local storage, processing, or both of measured data in the measurement unit;
   means for transferring the measured data from the measuring point to the process unit, the means for transferring optionally comprising means for converting the measured data, into digital signals including an analog-to-digital converter when said measured data are made available by the measuring point in analog form;
   wherein the process unit includes means for subsequently writing the measured data into a database of the control center;
   means for controlling by filing the control commands in the control center, said means for controlling by filing the control commands comprising
      means in the control center for filing the control commands in a database; and
      means in the process unit for independently periodically reading out said control commands from the control center, from a database, or both, and controlling the measurement unit based on said control commands.

2. The measurement unit as claimed in claim 1, further comprising:
   means in the process unit for at least partially processing the measured data before being transferred to the control center.

3. The measurement unit as claimed in claim 1, further comprising:
   means for transferring measured data which has been measured in an essentially continuous or clocked fashion from the process unit to the control center in periodic packets.

4. The measurement unit as claimed in claim 1, wherein the control center further comprises means for providing parameters assigned to the control commands, files, or both, said parameters being provided in a database; and
   the process unit further comprises means for periodically reading out said parameters together with the control commands, and for controlling the measurement unit based on said control commands and associated parameters.

5. The measurement unit as claimed in claim 1, wherein the process unit further comprises:
   means for acknowledging a corresponding action to the control center, a database, or both, after control commands, parameters, or both, are read out of the control center, out of the databases, or both.

6. The measurement unit as claimed in claim 1, wherein the process unit further comprises:
   means for reading from, writing to, or both, at least one of the databases not directly relevant to the measured data, at least 1 to 20 times per minute.

7. The measurement unit as claimed in claim 1, wherein the control center comprises a data server, a database, or both; and further comprising:
   a network interface, communication interface, or both.

8. The measurement unit as claimed in claim 1, wherein said measurement unit is configured and arranged for measuring and collecting partial-discharge data at a generator system.

9. A method for collecting and forwarding measured data by using a measurement unit, the method comprising:
   providing a measuring unit including
      at least one measuring point for determining the measured data;
      at least one interface for at least indirectly transferring the measured data to a control center;
      a process unit and means for local storage, processing, or both of measured data in the measurement unit;
      means for transferring the measured data from the measuring point to the process unit, the means for transferring optionally comprising means for converting the measured data into digital signals including an analog-to-digital converter when said measured data are made available by the measuring point in analog form;
      wherein the process unit includes means for subsequently writing the measured data into a database of the control center;
   independently periodically filing measured data by the measurement unit in the control center, in a database, in a file in the control center, or combinations thereof;
   periodically and independently retrieving control commands by the measurement unit and, optionally associated parameters from the control center, from databases, from files in the control center, or combinations thereof; and
   periodically filing the status of the measurement unit in the control center, in a database, in files, or combinations thereof.

10. The measurement unit as claimed in claim 2, wherein the means for at least partially processing the measured data comprise means for compression, filtering, assignment, mathematical transformation, or combinations thereof.

11. The measurement unit as claimed in claim 3, wherein the means for transferring in periodic packets transfers at a rate of at least 1 to 20 times per minute.

12. The measurement unit as claimed in claim 7, wherein the network interface comprises a local wired or wireless network.

13. The measurement unit as claimed in claim 8, wherein said measurement unit is configured and arranged for measuring and collecting partial discharges detected at a high-voltage terminal.

* * * * *